(12) United States Patent
Plichon et al.

(10) Patent No.: US 11,678,771 B2
(45) Date of Patent: Jun. 20, 2023

(54) MANUAL FOOD CHOPPER WITH DUAL SEALING SYSTEM

(71) Applicant: SEB S.A., Ecully (FR)

(72) Inventors: Stéphane Plichon, Allonzier la Caille (FR); David Benoit, Gruffy (FR)

(73) Assignee: SEB S.A.

( * ) Notice: Subject to any disclaimer, the term of this patent is extended or adjusted under 35 U.S.C. 154(b) by 269 days.

(21) Appl. No.: 17/162,493

(22) Filed: Jan. 29, 2021

(65) Prior Publication Data

US 2021/0244236 A1  Aug. 12, 2021

(30) Foreign Application Priority Data

Feb. 7, 2020 (FR) ...................................... 2001214

(51) Int. Cl.
*A47J 43/044* (2006.01)
*A47J 43/07* (2006.01)
*A47J 43/08* (2006.01)

(52) U.S. Cl.
CPC ......... *A47J 43/044* (2013.01); *A47J 43/0705* (2013.01); *A47J 43/0711* (2013.01); *A47J 43/0755* (2013.01); *A47J 43/082* (2013.01)

(58) Field of Classification Search
CPC ... A47J 43/044; A47J 43/0705; A47J 43/0755
See application file for complete search history.

(56) References Cited

U.S. PATENT DOCUMENTS

| | | | | |
|---|---|---|---|---|
| 6,899,021 | B2 * | 5/2005 | Riede | A47J 43/24 99/511 |
| 7,264,189 | B2 * | 9/2007 | Holcomb | A47J 43/105 241/101.1 |
| 9,955,821 | B2 * | 5/2018 | Herren | A47J 43/255 |

FOREIGN PATENT DOCUMENTS

| | | | | |
|---|---|---|---|---|
| CN | 107969899 A | * | 10/2017 | ......... A47J 43/0727 |
| CN | 107969902 A | * | 10/2017 | ............ A47J 43/046 |
| CN | 107969938 A | * | 10/2017 | ......... A47J 43/0755 |
| EP | 0963726 A1 | | 12/1999 | |
| EP | 0311718 A1 | | 4/2018 | |
| FR | 2896395 A1 | | 7/2007 | |

OTHER PUBLICATIONS

Preliminary Search Report for Application No. FR 2001214, dated Oct. 22, 2020, 2 pages.

* cited by examiner

*Primary Examiner* — Faye Francis
(74) *Attorney, Agent, or Firm* — Lerner David LLP

(57) ABSTRACT

A food processing appliance includes a bowl to contain the food, with a side wall, a rotary work accessory arranged in the bowl, a lid arranged on the bowl, the lid including a manually operated motor to cause a drive shaft to spin the work accessory around a rotation axis A by pulling on a cord transversely to the axis A. The lid includes: a first dynamic gasket arranged between the lid and the side wall to fill the space therebetween; a second dynamic gasket, arranged between the lid and the drive shaft to fill the space therebetween; each gasket having an inner wall, a connecting part arranged on the lid, an annular lip and a groove; the lip movable and deformable with a displacement angle α extending outwards relative to the axis A, so as to ensure a watertight seal when the lid is connected to the bowl.

15 Claims, 9 Drawing Sheets

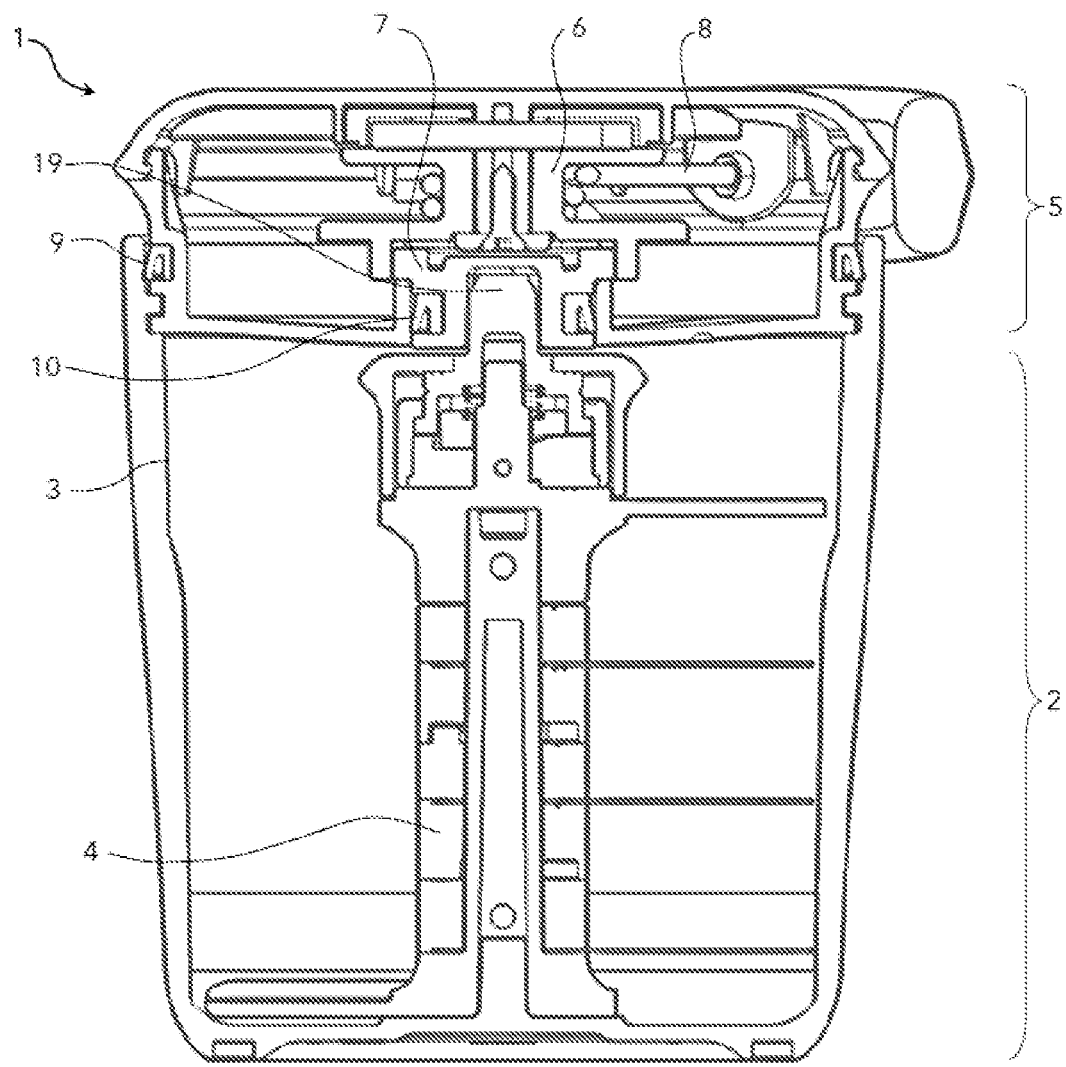
[Fig. 1]

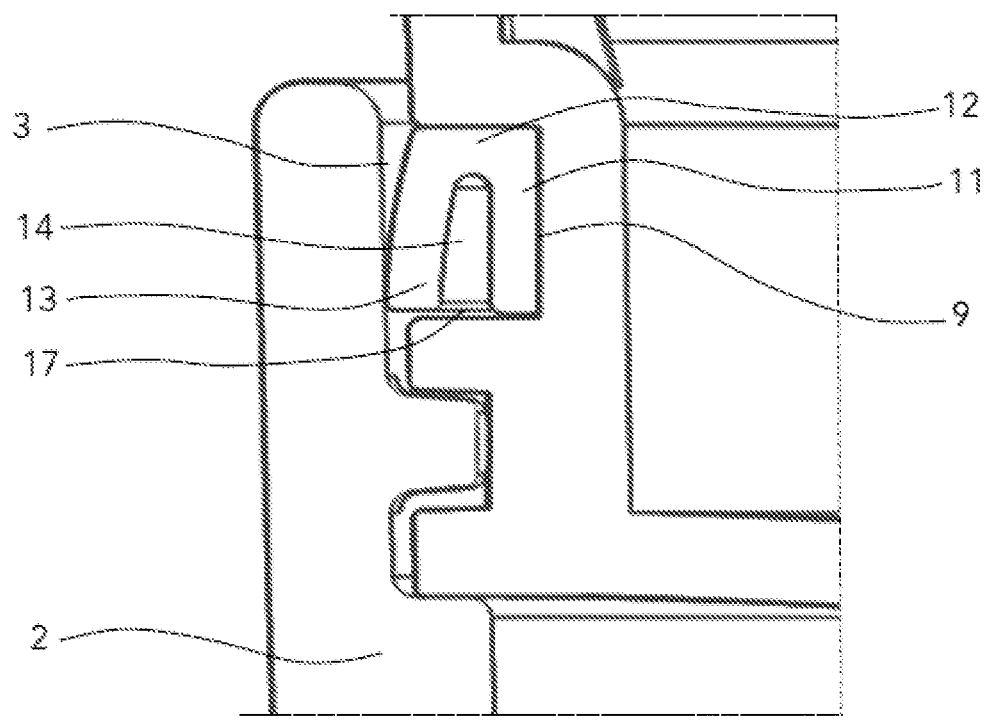
[Fig. 2]
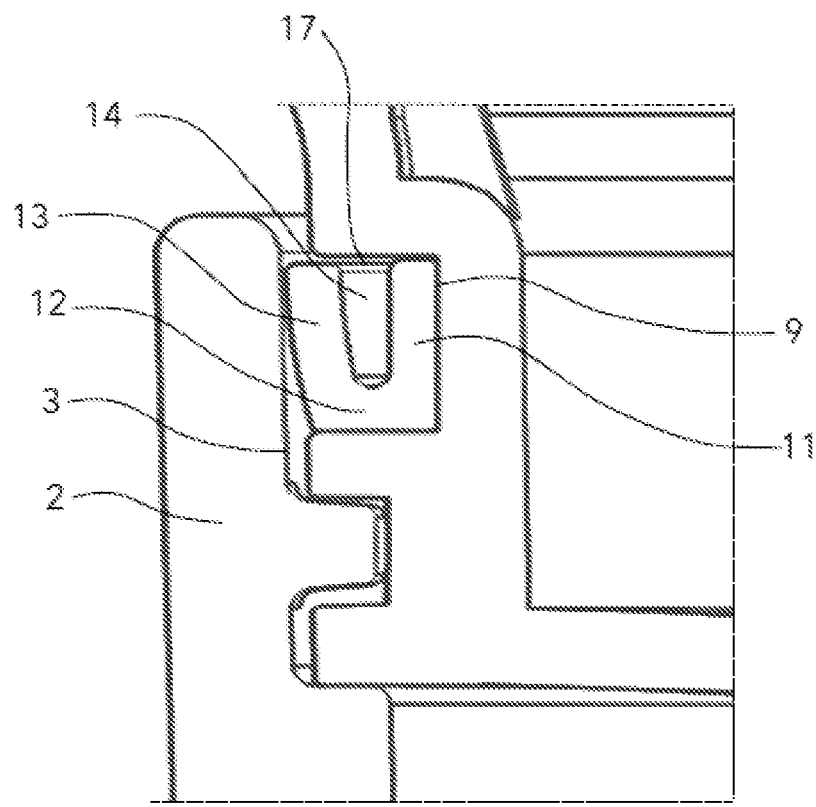
[Fig. 3]

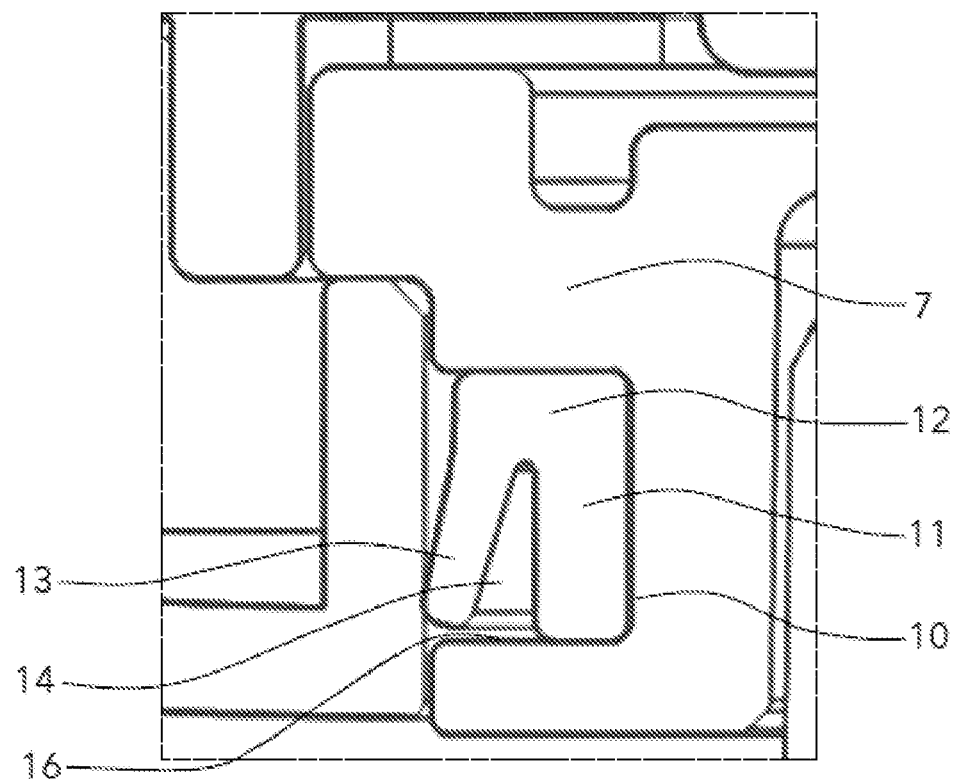
[Fig. 4]

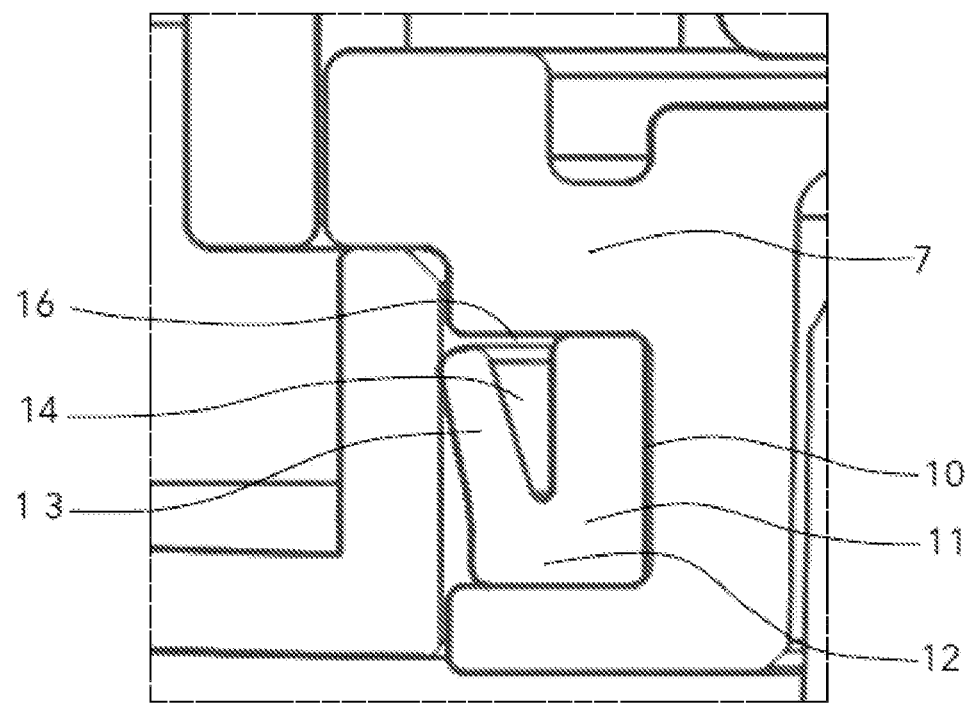
[Fig. 5]
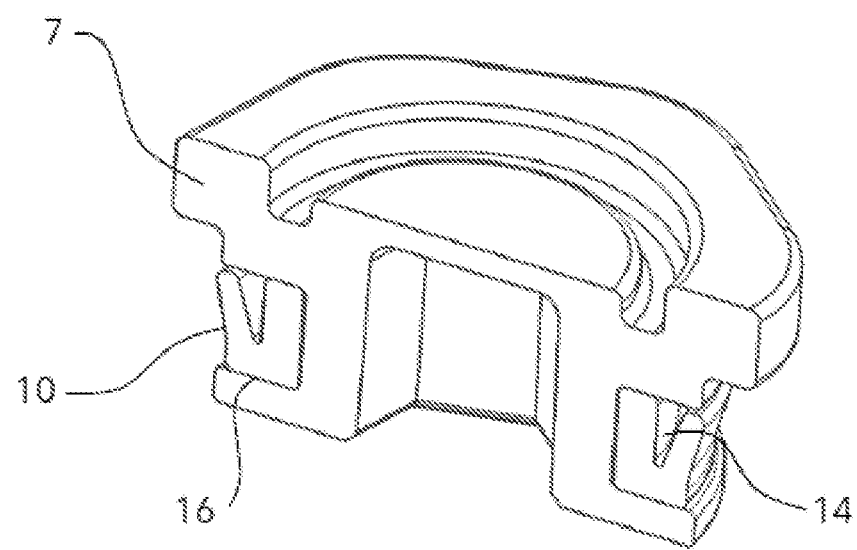
[Fig. 6]

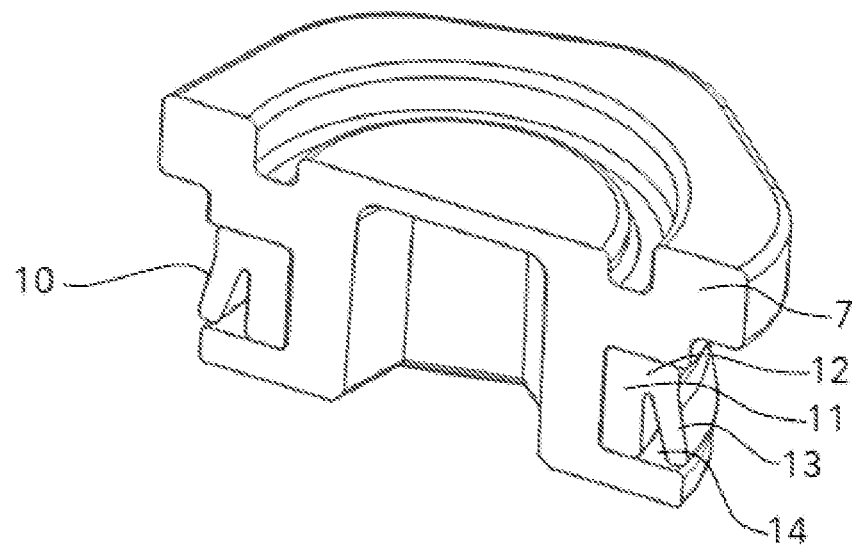
[Fig. 7]
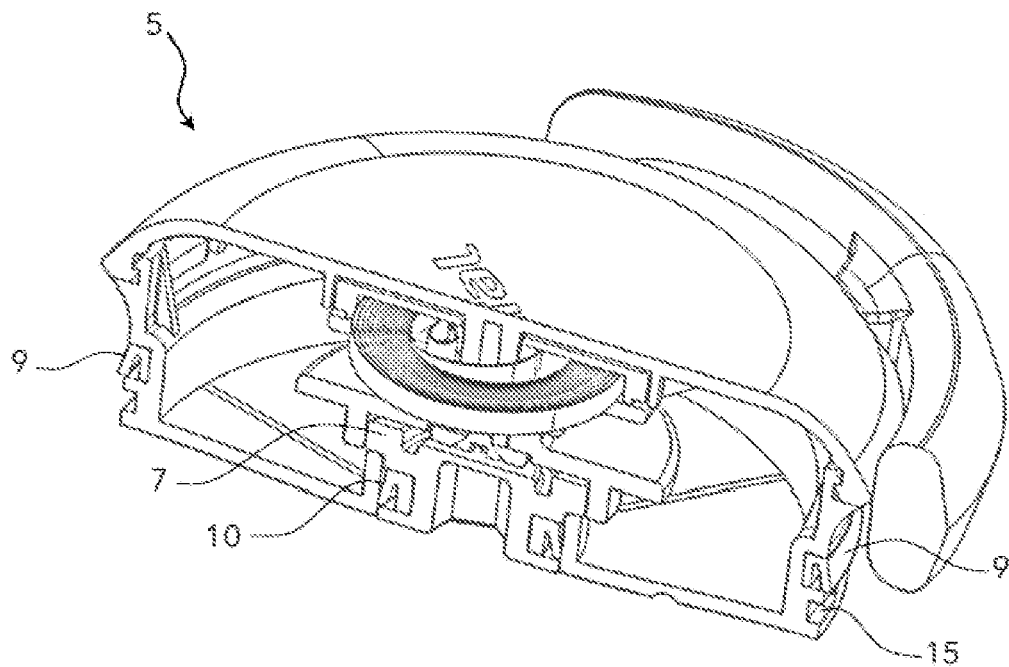
[Fig. 8]

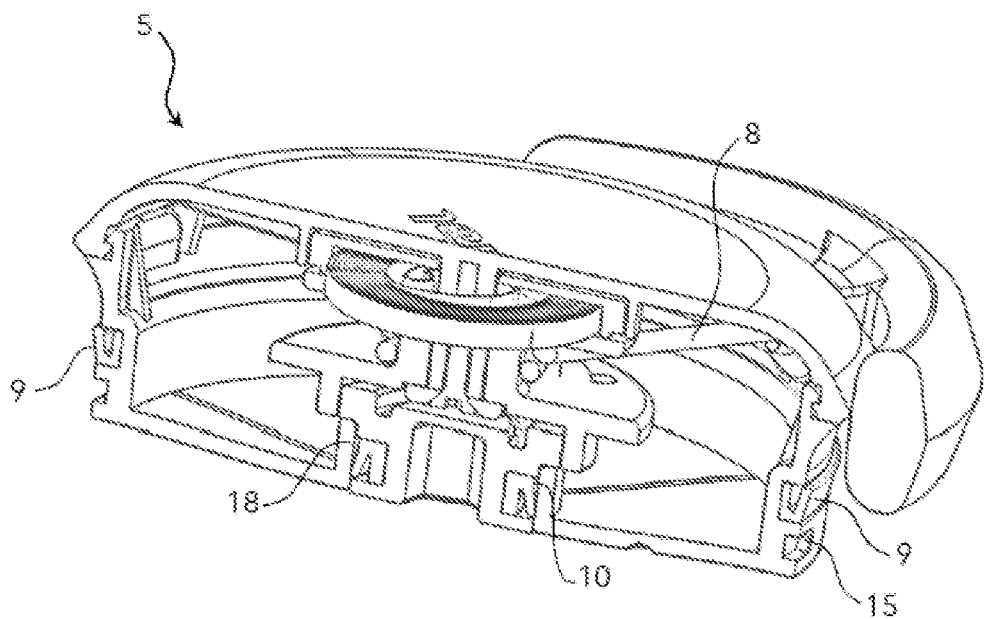
[Fig. 9]
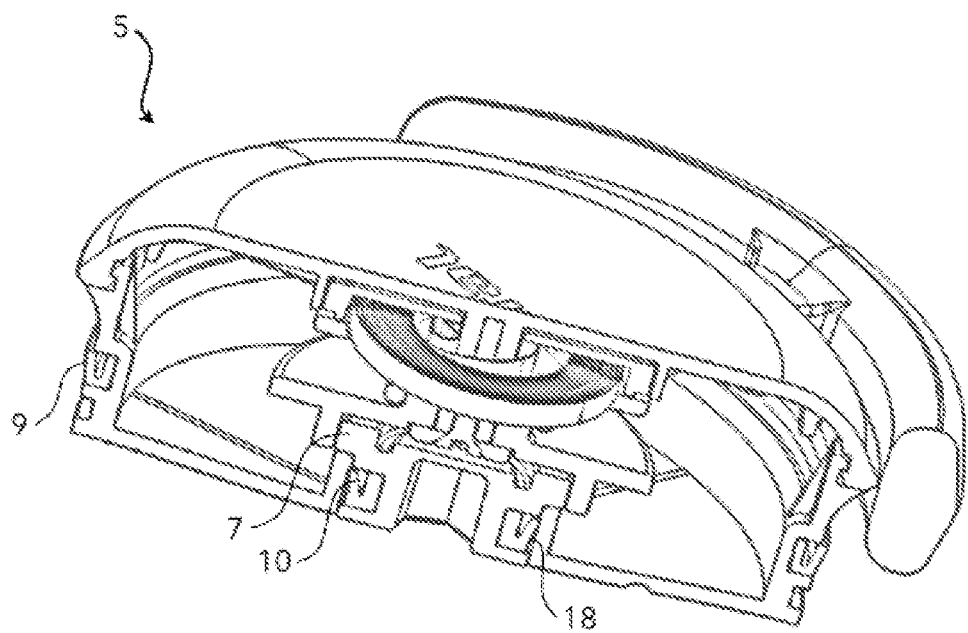
[Fig. 10]

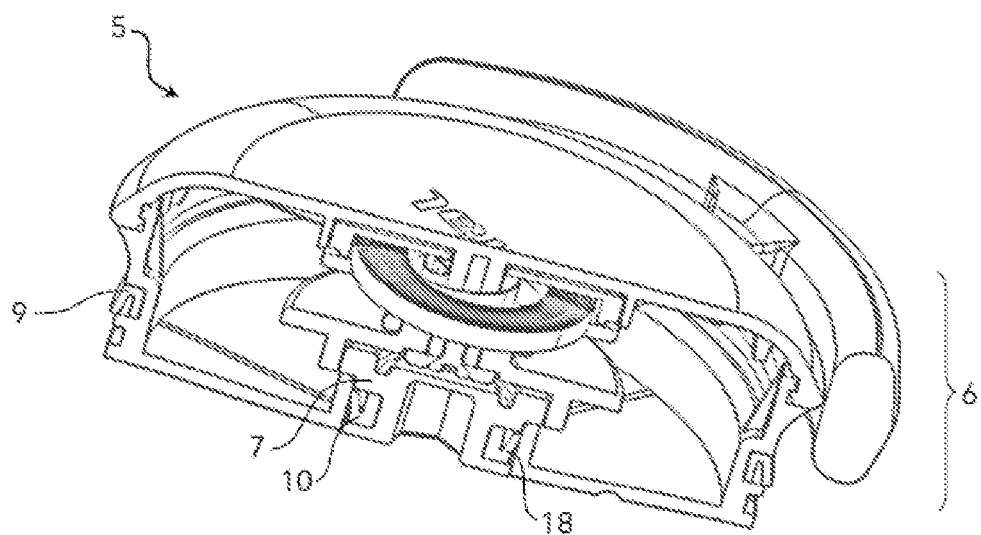
[Fig. 11]
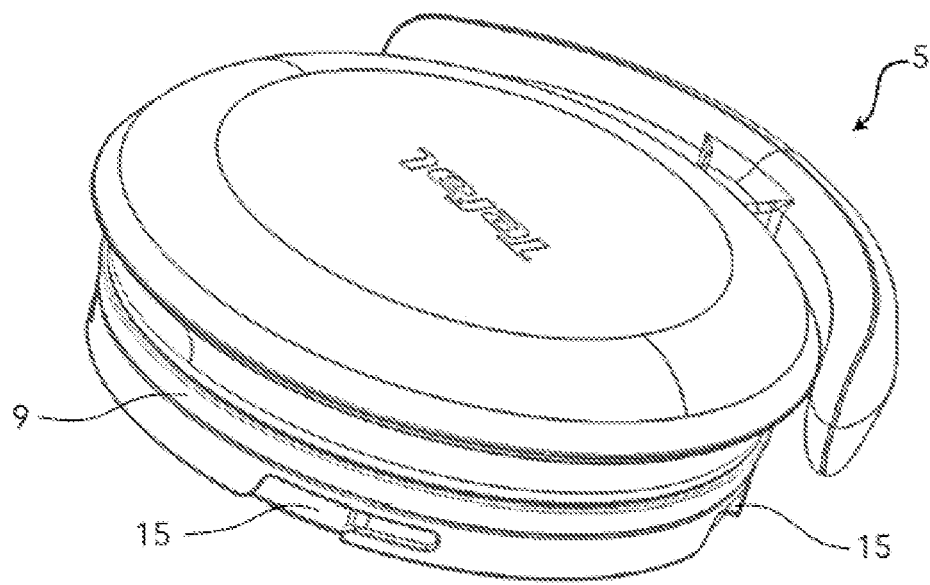
[Fig. 12]

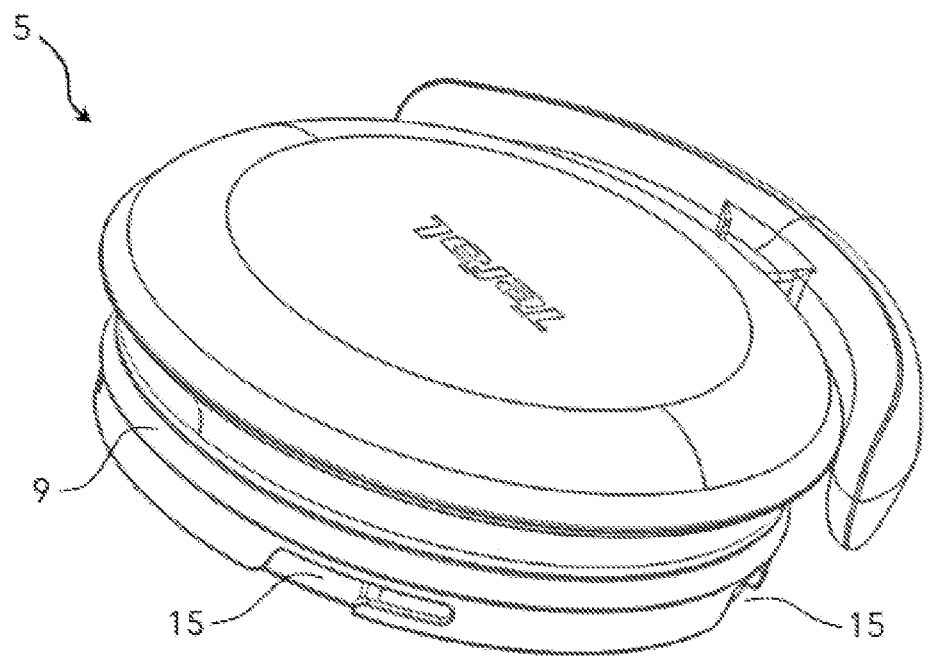
[Fig. 13]
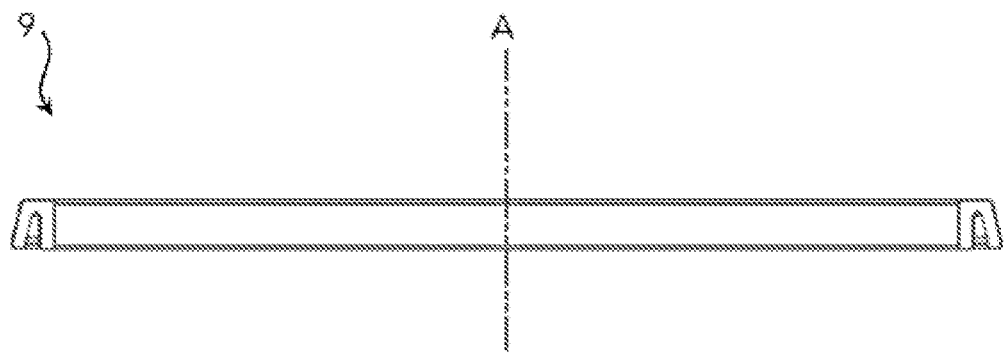
[Fig. 14]

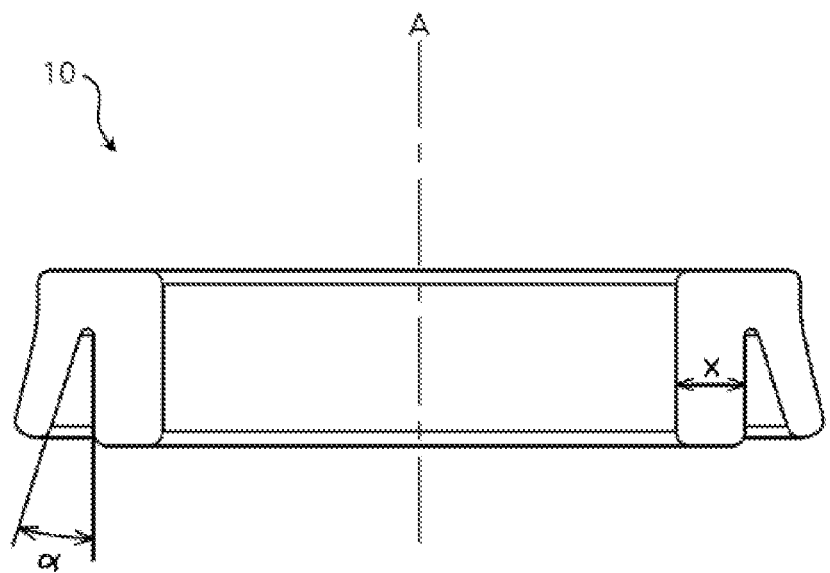
[Fig. 15]
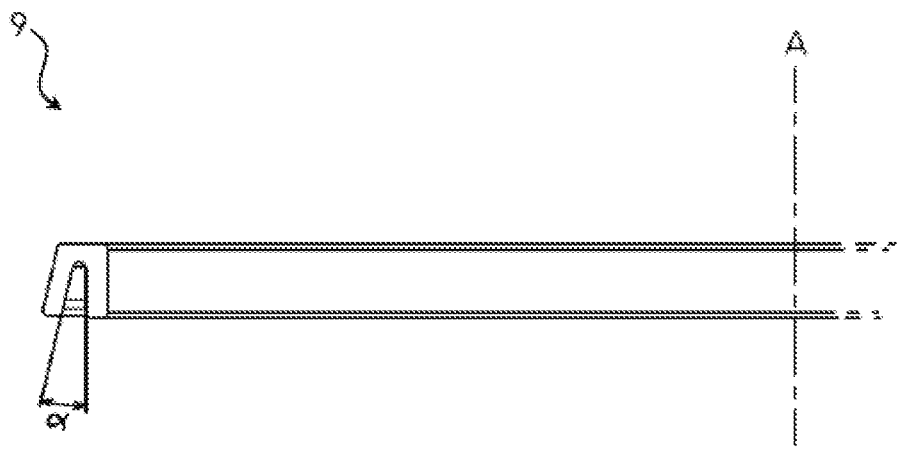
[Fig. 16]

MANUAL FOOD CHOPPER WITH DUAL SEALING SYSTEM

CROSS REFERENCE TO RELATED APPLICATIONS

This application claims priority from French application number 2001214, filed Feb. 7, 2020, the disclosure of which is hereby incorporated herein by reference.

TECHNICAL FIELD OF THE INVENTION

The present invention relates to the culinary field, and in particular to that of food processing appliances comprising a manually-operated cord drive device and a bowl forming a container, such as choppers, ricers, juicers, salad spinners or mixers. These appliances are manually-operated and are therefore non-electrical, making it possible to transmit movement from one part to another part by pulling a wire or a cord. The present invention relates more particularly to appliances of the aforementioned type comprising a gasket between the working container and the upper part of the appliance.

It should be noted that in this document, the terms "longitudinal," "transversal," "perpendicular," "parallel," "rotation," "horizontal," "vertical," "lower," "upper," "high," "low," "separating," "coaxial," "convex," "concave," "flat" used to describe the device, refer to the device when in use, when set on a horizontal surface.

PRIOR ART

It is known food processing appliances with O-rings made of flexible materials such as silicone and mounted on a lid, which reduce the space between the lid and its bowl, providing a watertight seal with regard to liquids.

The drawback of these O-rings is their limited dimensional variation, which results in less leeway and compressibility. In fact, to ensure a watertight seal between two walls, a gasket should fit into the space between these two walls and fill this space to ensure watertightness. O-rings have a low compression capacity, which consequently limits their ability to adjust to and fill the space.

Moreover, some manual choppers have a bayonet fitting device. To close them with such bayonet fitting devices, the lid must be placed above the bowl and must rotate to the closed position and inversely to the open position. An O-ring's capacity to enable this rotation of the lid to lock it with a bayonet fitting is limited due to the friction of the gasket against the bowl. Indeed, the frictional force required to lock the lid onto the bowl, by means of a bayonet fitting device, is too high and is not acceptable for easy opening by a user. The O-rings' limited dimensional variation does not reduce this friction and tends to cause the rotation to jam, especially when the O-ring is sized for the maximum clearance guaranteeing a watertight seal. The drawback with O-rings is that they can accommodate only a limited range of dimensional variation tolerance, which is not compatible with the tolerances that are necessary when the parts are obtained using plastic injection methods.

Manually-operated food processing appliances also comprise a bowl to contain the food to be processed; a removable rotary work accessory arranged in the bowl, which is generally a rotary drive system to spin cutting blades; a removable lid closing the bowl comprising a manually-operated motor to spin a drive shaft and the rotary work accessory around a rotation axis by pulling a cord transversely to the rotation axis. The manually-operated motor generally comprises a drive wheel, a spring and a cord, one end of which is wound around the drive wheel and the other end of which is connected to a handle.

For the cutting knives or blades to rotate correctly, it is often necessary to allow for clearance between the rotary part and the fixed part for free rotation without friction.

"Clearance" is generally understood to mean, within the meaning of the invention, an element's leeway to move due to a space between two parts or two surfaces. Yet again, the same problems arise with O-rings, which are often used to eliminate this clearance between the parts, due to their limited dimensional variation, which results in reduced leeway and compressibility.

However, limited the clearance, a semi-liquid-to-liquid food preparation can often flow up along the drive (rotary knife drive system) and get into the inner area of the lid where the manual actuating mechanism is present. It is impossible to properly clean this area without removing the lid, which is often not designed to be removable. Since an O-ring cannot adjust to the space to be filled, as this space is even larger and more variable when the parts are derived from a plastic injection process, the watertightness of the chopper is not ensured.

The purpose of the invention is therefore to remedy the aforementioned drawbacks and to provide a manual chopper with a perfectly watertight seal at the clearances between the lid and the bowl, and between the lid and the drive shaft, without hindering the rotation of the lid or the drive shaft. Thus, the problem remedied by the invention is to create a watertight seal while maintaining the mobility of the parts of the lid, especially when they are rotating. Absolute watertightness of the chopper lid and bowl makes it possible for a user to prepare liquid food preparations in the bowl and to mix this food preparation by shaking the chopper.

The inventors unexpectedly found that gaskets with a movable and deformable annular lip can be used to ensure a watertight seal on the chopper while maintaining the need for free rotation of the lid and the drive shaft.

Advantageously, the annular lip gasket on the chopper according to the invention enables effortless lid rotation to pivot the lid on the bowl to the closed position or inversely to the open position by means of a bayonet fitting device. As the annular lip of the gasket has a very thin contact surface with the fixed part of the bowl, friction is very low. Moreover, the bend of the annular lip allows it to work with less resistance and not jam or block the lid during its rotation, thus enabling free rotation of the rotary part, sufficient to provide a watertight barrier to the liquid-to-semi-liquid preparation.

Furthermore, the chopper according to the invention has the advantage of proposing a single gasket geometry but two positions on the lid to guarantee its watertightness. The same gasket geometry is used for the lid housing and the drive shaft housing.

Another advantage of the invention is that the gasket can adjust to the dimensional variations in the space into which it is placed, i.e. the gasket housing.

Another advantage of the invention is that the chopper can be agitated manually by a user in order to shake the semi-liquid or liquid food preparation to mix the preparations, without any projection outside the appliance and without any projection onto the inner lid where the drive mechanism is housed.

Another advantage of the invention is that the gasket can cooperate with the lid. In fact, its flexible nature and structural design allow it to compress, neither too much nor too little, to compensate for the actual clearance between the lid and the bowl, and the lid and the drive shaft.

PRESENTATION OF THE INVENTION

The present invention relates to a manually-operated food preparation appliance comprising
a bowl to contain the food to be processed with a side wall,
a removable rotary work accessory arranged in the bowl,
a removable lid placed on the bowl,
the lid comprising a manually-operated motor to cause a drive shaft of the rotary work accessory to spin around a rotation axis A by pulling on a cord transversely to the rotation axis A,
characterized in that the lid comprises
a first dynamic gasket arranged between the lid and the side wall of the bowl to fill the space between the lid and the bowl;
a second dynamic gasket, arranged between the lid and the drive shaft in order to fill the space between the drive shaft and the lid;
each gasket has an inner wall, a connecting part arranged on the lid, an annular lip and a groove;

The annular lip is movable and deformable with a displacement angle $\alpha$ extending outward relative to the rotation axis A, so as to ensure watertightness when the lid is connected to the bowl in the working position. The first gasket is dynamic in its use because it is movable relative to the bowl but remains coupled with the lid. The second gasket is dynamic in its use because it is movable relative to the lid but remains coupled with the drive shaft, unlike static gaskets. The connecting part acts as a joint that enables angular displacement of the lip.

According to another characteristic of the appliance according to the invention, the first and second dynamic gaskets can be annular. These annular dynamic gaskets can be in the shape of a circular or rectangular ring.

According to another characteristic of the invention, these dynamic gaskets can ideally be manufactured from a flexible material such as, for example, silicone or a thermoplastic elastomer.

According to another characteristic of the appliance according to the invention, the connecting part of the first or second gasket can be in the lower position allowing for easy insertion of the lid on the bowl. Thus, the first gasket has a connecting part preferably turned towards the work unit, enabling easy insertion of the lid during its docking on the bowl. The second gasket enables easy insertion of the drive shaft in its cooperation with the bore of the lid. In these two cases, insertion is facilitated because the lower position of the connecting part positions the annular lip as an insertion cone that facilitates its placement. The arrangement of the annular lip will slide it along the side wall of the bowl when closing the food processing appliance, due to the inclined positioning of the bevel-shaped lip.

According to another characteristic of the appliance according to the invention, the connecting part of the first or of the second gasket is in the upper position. Thus, the first or the second gasket has a connecting part that is preferably turned towards the lid.

Advantageously, this arrangement guarantees maximum watertightness of the food processing appliance. In fact, in this position, as the liquid or semi-liquid tends to either rise along the drive shaft or along the bowl, or tends to be projected by the work unit, it will fill the groove of the gasket and exert pressure against the fixed inner wall and the annular lip. As the latter is capable of deforming, it will flatten against the side wall of the bowl for the first gasket and against the bore of the lid for the second gasket, thus ensuring maximum watertightness.

According to another characteristic of the appliance according to the invention, the annular lip of the second gasket can be inclined so as to enable free rotation of the drive shaft. Thus, the frictional force of the annular lip of the second gasket against the bore does not prevent the cord from moving when it is pulled or from retracting. Preferably, the friction force of the annular lip of the second gasket is less than the spring recoil force. Otherwise, the friction force of the annular lip could prevent free rotation if this force was too high, and block the movement of the drive shaft and the cord retraction movement.

According to another characteristic of the appliance according to the invention, the annular lip of the first gasket is inclined so as to allow the lid to rotate freely when it is locked onto the bowl by a bayonet fitting device. Thus, the thickness and geometry of the gasket are advantageously sized to ensure the best compromise between watertightness and free rotation of the parts, without causing any blockage of the parts, in particular due to the force exerted by a user locking or unlocking the bayonet fitting device.

According to another characteristic of the appliance according to the invention, the groove of the first and second gaskets is arranged between the inner wall, the connecting part and the annular lip. Thus, this space formed by the groove is a displacement space to enable the annular lip to ensure its sealing function. In fact, the groove creates a space that allows the annular lip to return to the inner wall of the gasket without deforming it, with the connecting part acting as a joint and the annular lip bending from this joint towards the groove.

According to another characteristic of the appliance according to the invention, the section of the inner wall has a width x which is at least equal to the width of the section of the annular lip. Thus, the section of the inner wall has a width x greater than that of the width of the section of the annular lip, which generally determines the flexibility of the lip. This flexibility is relative in relation to that of the inner wall. This makes it possible to ensure the mobility of the annular lip without the inner wall detaching or lifting away from its housing, while preserving the geometry of the gasket regardless of the deformation of the annular lip. The lip remains movable within its full displacement angle $\alpha$ without causing any deformation of the inner wall of the gasket.

Advantageously, the first gasket is arranged in a first housing which can be a slot or notch in the lid. The first housing is a space cooperating with the gasket in order to receive it. The geometry of the housing is adapted to the gasket so that it can cooperate and be inserted into it. Thus, the first housing makes it easy to position and turn the gasket in relation to the bowl.

Advantageously, the second gasket is arranged in a second housing that can be a slot or notch in the drive shaft. The second housing is a space cooperating with the gasket in order to receive it. The geometry of the housing is adapted to the gasket so that it can cooperate and be inserted into it. Thus, the second housing makes it easy to position and turn the gasket relative to the lid.

According to another characteristic of the appliance according to the invention, the displacement angle $\alpha$ is comprised from 0° to 90°, preferably from 0° to 45°. Thus, the displacement angle $\alpha$ makes it possible to compensate for the dimensional variations of the residual space between the bore of the lid and the drive shaft, and between the lid and the bowl.

The annular lip of the first gasket is at its maximum displacement angle α when the lid is detached from the appliance, i.e. in the at-rest position. The annular lip of the first gasket is at its αminimum displacement angle when the lid is connected to the bowl in the working position.

The annular lip of the second gasket is at its α maximum displacement angle when the drive shaft is disassembled from the lid and removed from the lid bore. The annular lip of the second gasket is at its minimum displacement angle α when the drive shaft is mounted on the lid.

According to another characteristic of the appliance according to the invention, the first gasket is removable and elastically arranged in a first housing of the lid. Thus, the gaskets can be more easily removed and this will facilitate cleaning. Indeed, as the gaskets are removable so that they can be cleaned more easily, they can be easily repositioned.

According to another characteristic of the appliance according to the invention, the second gasket is removable and elastically arranged at the level of a second housing of the drive shaft. Thus, the ease of disassembly, cleaning and reassembly is equivalent to that of the first gasket.

According to another characteristic of the appliance according to the invention, the inner wall of the first and of the second gasket is arranged facing the annular lip. Thus, the lip and the inner wall are arranged opposite each other and form a deformation space, called the groove, determining the spring pressure according to the displacement angle α.

According to a variant of the appliance according to the invention, the inner wall can be arranged transversely relative to the movable annular lip. Thus, the clearance space, which allows the lip to ensure its sealing function, is preserved.

According to another characteristic of the appliance according to the invention, each gasket has a U-shaped or V-shaped section.

According to another characteristic, the appliance according to the invention can be a chopper, a juicer or a mixer.

BRIEF DESCRIPTION OF THE DRAWINGS

The following is a description of specific embodiments of the present invention, provided by way of example and not limited thereto. It will help us to better understand the purposes, aspects and advantages of this invention, in conjunction with the drawings in the annexes, wherein:

FIG. 1 is a cross-sectional view of a food processing appliance according to the invention, in this case a food chopper, comprising a first and a second dynamic gasket. The chopper is arranged in its working phase according to a particular embodiment of the invention.

FIG. 2 is a cross-sectional view of a first gasket with its connecting part in the upper position according to a particular embodiment of a chopper according to the invention.

FIG. 3 is a cross-sectional view of a first gasket with its connecting part in the lower position according to a particular embodiment of a chopper according to the invention.

FIG. 4 is a cross-sectional view of a second gasket with its connecting part in the upper position according to a particular embodiment of a chopper according to the invention.

FIG. 5 is a cross-sectional view of a second gasket with its connecting part in the lower position according to a particular embodiment of a chopper according to the invention.

FIG. 6 is a perspective view of a second gasket with its connecting part in the lower position arranged on the drive shaft of the manually-operated motor according to a particular embodiment of a chopper according to the invention.

FIG. 7 is a perspective view of a second gasket with its connecting part in the upper position arranged on the drive shaft of the manually-operated motor according to a particular embodiment of a chopper according to the invention.

FIG. 8 is a perspective view of a lid of a chopper according to the invention according to a particular embodiment having a first gasket with its connecting part in the upper position and a second gasket with its connecting part in the upper position arranged on the drive shaft of the manually-operated motor.

FIG. 9 is a perspective view of a lid of a chopper according to the invention according to a particular embodiment having a first gasket with its connecting part in the lower position and a second gasket with its connecting part in the upper position arranged on the drive shaft of the manually-operated motor.

FIG. 10 is a perspective view of a lid of a chopper according to the invention according to a particular embodiment having a first gasket with its connecting part in the lower position and a second gasket with its connecting part in the lower position arranged on the drive shaft of the manually-operated motor.

FIG. 11 is a perspective view of a lid of a chopper according to the invention according to a particular embodiment having a first gasket with its connecting part in the upper position and a second gasket with its connecting part in the lower position arranged on the drive shaft of the manually-operated motor.

FIG. 12 is a perspective view of a lid of a chopper according to the invention according to a particular embodiment having a first gasket with its connecting part in the lower position.

FIG. 13 is a perspective view of a lid of a chopper according to the invention according to a particular embodiment having a first gasket with its connecting part in the upper position.

FIG. 14 is a cross-sectional view of a first gasket of a chopper according to the invention according to a particular embodiment.

FIG. 15 is a cross-sectional view of a second gasket of a chopper according to the invention according to a particular embodiment.

FIG. 16 is a cross-sectional view of a first gasket of a chopper according to the invention according to a particular embodiment.

DESCRIPTION OF THE EMBODIMENTS

FIG. 1 illustrates an example of an appliance according to the invention. This is a manually-operated chopper 1 comprising a bowl 2 to hold the food to be cut, having a side wall 3, a removable rotary cutting accessory 4 arranged in bowl 2, a removable lid 5 placed on bowl 2. The lid 5 comprises a manually-operated motor 6 to cause a drive shaft 7 of the rotary cutting accessory 4 to spin around a rotation axis A by pulling a cord 8 transversely to the rotation axis A. The manually-operated motor 6 comprises a drive wheel, a return spring (visible in FIGS. 8, 9, 10 and 11) and a cord 8 one end of which is wound around the drive wheel and the other end of which is connected to a handle.

The rotational movement is transmitted by the drive shaft 7 of the motor to the work unit via a coupling 19. The lid 5 comprises a first dynamic gasket 9 arranged between the lid 5 and the side wall 3 of the bowl 2 in order to fill the space between the lid 5 and the bowl 2. The lid 5 comprises a second dynamic gasket 10, arranged between the lid 5 and the drive shaft 7 in order to fill the space between the drive shaft 7 and the bore 18 of the lid 5; each gasket 9; 10 having an inner wall 11, a connecting part 12 arranged on the lid 5, an annular lip 13 and a groove 14. The annular lip 13 is movable and deformable with a displacement angle α (visible in FIGS. 15 and 16) extending outward relative to the rotation axis A, so as to ensure watertightness when the lid 5 is connected to the bowl 2 in the working position.

The operation of the chopper shown in FIG. 1 is as follows. A user takes the lid 5 and installs the first gasket 9, after cleaning it, in its housing 17 which is a slot arranged around the edge of the lid 5. As shown in FIG. 1, the user positions the connecting part 12 upward towards the upper part of the lid 5. The user then takes the second gasket 10, after cleaning it, and places it in its housing 16, which is a slot arranged around the drive shaft 7. When the drive shaft 7 has been reassembled in the bore 18 of the lid 5 and the assembly closed, the lid 5 thus equipped with its two gaskets is brought towards the bowl 2 in order to dock the lid 5. The user positions the pins on the bowl opposite the bayonets 15 on the lid (visible in FIG. 9).

FIG. 2 illustrates the first gasket 9 arranged in the first housing 17 of the lid 5, with its connecting part 12 facing upwards and its annular lip 13 facing downwards, i.e. towards the working accessory 4. The inner wall 11 is arranged at the bottom of the first housing 17 of the lid.

FIG. 3 illustrates the first gasket 9 arranged in the first housing 17 of the lid 5, with its connecting part 12 facing downwards, i.e. towards the working accessory 4, and its annular lip 13 facing upwards, i.e. towards the lid 5. The inner wall 11 is arranged at the bottom of the first housing 17 of the lid.

FIG. 4 illustrates the second gasket 10 arranged in the second housing 16 of the lid 5, with its connecting part 12 facing upwards and its annular lip 13 facing downwards, i.e. towards the working accessory 4. The inner wall 11 is arranged in the bottom of the second housing 16 of the drive shaft 7.

FIG. 5 illustrates the second gasket 10 arranged in the second housing 16 of the drive shaft 7, with its connecting part 12 facing downwards, i.e. towards the working accessory 4 and its annular lip 13 facing upwards, i.e. towards the lid 5. The inner wall 11 is arranged at the bottom of the second housing 16 of the drive shaft 7 of the lid 5.

FIG. 6 illustrates the second gasket 10 arranged in the second housing 16 of the drive shaft 7, with its connecting part 12 facing downwards, i.e. towards the working accessory 4, and its annular lip 13 facing upwards, i.e. towards the lid 5. The inner part 11 is placed at the bottom of the second housing 17 of the lid.

FIG. 7 illustrates the second gasket 10 arranged in the second housing 16 of the drive shaft 7, with its connecting part 12 facing upwards, i.e., towards the lid 5, and its annular lip 13 facing downwards, i.e. towards the work accessory 4. The inner part 11 is placed at the bottom of the second housing 17 of the lid.

FIG. 8 illustrates the lid 5 with the first and second gaskets 9, 10 arranged with their connecting parts 12 facing upwards, i.e., towards the lid 5, and their annular lips 13 facing downwards, i.e., towards the work accessory 4.

FIG. 9 illustrates the first gasket 9 arranged in the first housing 17 of the lid 5, with its connecting part 12 facing downwards, i.e. towards the working accessory 4, and its annular lip 13 facing upwards, i.e. towards the lid 5. The second gasket 10 is arranged in the second housing 16 of the drive shaft 7, with its connecting part 12 facing upwards, i.e., towards the lid 5, and its annular lip 13 facing downwards, i.e., towards the work accessory 4.

FIG. 10 illustrates the lid 5 with the first and second gaskets 9, 10 arranged with their connecting parts 12 facing downwards, i.e., towards the working accessory 4, and their annular lips 13 facing upwards, i.e., towards the lid 5.

FIG. 11 illustrates the first gasket 9 arranged in the first housing 17 of the lid 5, with its connecting part 12 facing upwards, i.e., towards the lid 5, and its annular lip 13 facing downwards, i.e., towards the working accessory 4. The second gasket 10 arranged in the second housing 16 of the drive shaft 7 housed in the bore 18 of the lid 5, with its connecting part 12 facing downwards, i.e., towards the working accessory 4, and its annular lip 13 facing upwards, i.e., towards the lid 5.

FIG. 12 illustrates the lid 5 with the first gasket 9, whose connecting part 12 is facing downwards and which has a bayonet fitting device 15.

FIG. 13 illustrates the lid 5 with the first gasket 9, whose connecting part 12 is facing upwards and which has a bayonet fitting device 15.

FIG. 14 illustrates the first gasket 9.

FIG. 15 illustrates the second gasket 10 with its α displacement angle.

FIG. 16 illustrates the first gasket 10 with its α displacement angle.

The invention claimed is:

1. A manually-operated food processing appliance comprising:
   a bowl to contain the food to be processed, with a side wall;
   a removable rotary work accessory arranged in the bowl and having a drive shaft;
   a removable lid arranged on the bowl, the removable lid comprising a manually-operated motor configured to cause the drive shaft to spin around a rotation axis A by pulling on a cord transversely to the rotation axis A,
   wherein the lid comprises:
   a first dynamic gasket arranged between the removable lid and the side wall of the bowl to fill the space between the removable lid and the bowl;
   a second dynamic gasket, arranged between the removable lid and the drive shaft to fill the space between the drive shaft and the removable lid;
   wherein each of the first and second dynamic gaskets has an inner wall, a connecting part arranged on the removable lid, an annular lip and a groove, the annular lip configured to be movable and deformable with a displacement angle α extending outwards relative to the rotation axis A, so as to ensure a watertightness when the removable lid is connected to the bowl in the working position.

2. The food processing appliance according to claim 1, wherein the first and second dynamic gaskets are annular.

3. The food processing appliance according to claim 1, wherein the connecting part of the first or of the second dynamic gasket is in a lower position enabling easy insertion of the removable lid (onto the bowl.

4. The food processing appliance according to claim 1, wherein the connecting part of the first or of the second dynamic gasket is in an upper position.

5. The food processing appliance (1) according to claim 1, wherein the annular lip of the second gasket (10) is inclined so as to enable free rotation of the drive shaft.

6. The food processing appliance according to claim 1, wherein the annular lip of the first dynamic gasket is inclined so as to enable free rotation of the removable lid when locking the removable lid onto the bowl by a bayonet fitting device.

7. The food processing appliance according to claim 1, wherein the grooves of the first and second dynamic gaskets are arranged between the corresponding inner wall, the corresponding connecting part and the corresponding annular lip.

8. The food processing appliance according to claim 1, wherein a section of the inner wall has a width x which is at least equal to the width of a section of the annular lip.

9. The food processing appliance according to claim 1, wherein the displacement angle α ranges from 0° to 90°.

10. The food processing appliance according to claim 1, wherein the first dynamic gasket is removable and elastically arranged in a first housing of the removable lid.

11. The food processing appliance according to claim 1, wherein the second dynamic gasket is removable and elastically arranged at the level of a second housing of the drive shaft.

12. The food processing appliance according to claim 1, wherein the inner walls of the first and second dynamic gaskets are arranged facing the annular lip.

13. The food processing appliance according to claim 1, wherein the inner walls of the first and second dynamic gaskets are arranged transversely relative to the annular lip.

14. The food processing appliance claim 1, wherein each of the first and second dynamic gaskets has a U-shaped or V-shaped section.

15. An appliance according to claim 1, wherein the appliance is a chopper, a juicer or a mixer.

* * * * *